United States Patent [19]
Pruette et al.

[11] Patent Number: 5,961,678
[45] Date of Patent: Oct. 5, 1999

[54] FILTER DRAINAGE LAYER ATTACHMENT

[75] Inventors: Dean Mac Pruette, Blacksburg, Va.; Allan Bradford Thomas, Charlotte, N.C.

[73] Assignee: Flair Corporation, Ocala, Fla.

[21] Appl. No.: 08/963,274

[22] Filed: Nov. 3, 1997

Related U.S. Application Data

[63] Continuation-in-part of application No. 08/499,478, Jul. 7, 1995, abandoned.

[51] Int. Cl.$^6$ ............................. B01D 29/15; B01D 46/02
[52] U.S. Cl. ................................ 55/485; 55/487; 55/502; 55/505; 55/528; 55/DIG. 13; 55/DIG. 17; 55/DIG. 25; 210/448; 210/489; 210/496
[58] Field of Search ............................. 95/273, 286, 27; 55/485–487, 498, 502, 505, 508, 511, 519, 521, DIG. 13, DIG. 17, DIG. 25, DIG. 5; 210/446, 448, 488–492, 496

[56] References Cited

U.S. PATENT DOCUMENTS

| | | | |
|---|---|---|---|
| 2,334,840 | 11/1943 | Punton et al. | 55/498 X |
| 2,747,686 | 12/1952 | Riley et al. | |
| 3,016,345 | 1/1962 | Price | 95/287 X |
| 3,085,381 | 4/1963 | Sobeck | 55/485 X |
| 3,290,870 | 12/1966 | Jensen | 55/486 |
| 3,308,610 | 3/1967 | Springer et al. | 55/498 X |
| 3,352,423 | 11/1967 | Osterman | 210/496 |
| 3,450,632 | 6/1969 | Olson et al. | 210/491 X |
| 3,517,820 | 6/1970 | Mintz | 210/491 |
| 3,527,027 | 9/1970 | Knight et al. | 55/487 X |
| 3,567,619 | 3/1971 | Brown | 55/486 X |
| 3,708,965 | 1/1973 | Domnick | 55/498 X |
| 3,800,945 | 4/1974 | Fowler | 210/489 X |
| 3,802,160 | 4/1974 | Foltz | 95/273 |
| 3,876,544 | 4/1975 | Fowler | 210/489 X |
| 3,890,123 | 6/1975 | Kuga | 55/318 |
| 3,931,019 | 1/1976 | Fowler | 210/489 X |
| 3,997,305 | 12/1976 | Ulvestad et al. | 55/341.1 |
| 4,050,237 | 9/1977 | Pall et al. | 55/486 X |
| 4,058,456 | 11/1977 | Head | 95/273 X |
| 4,086,070 | 4/1978 | Argo et al. | 55/486 X |
| 4,102,785 | 7/1978 | Head et al. | 55/487 X |
| 4,111,815 | 9/1978 | Walker et al. | 55/486 X |
| 4,136,009 | 1/1979 | Samiran | 210/114 |
| 4,157,968 | 6/1979 | Kronsbein | 55/485 X |
| 4,249,918 | 2/1981 | Argo et al. | 95/273 |
| 4,265,647 | 5/1981 | Donachiue | 55/315 |
| 4,331,460 | 5/1982 | Dillmann et al. | 55/485 |
| 4,336,043 | 6/1982 | Aonuma et al. | 55/487 X |
| 4,385,913 | 5/1983 | Lane | 55/350 |
| 4,477,270 | 10/1984 | Tauch | 55/485 X |
| 4,487,617 | 12/1984 | Dienes et al. | 55/163 |
| 4,487,618 | 12/1984 | Mann | 55/323 |

(List continued on next page.)

FOREIGN PATENT DOCUMENTS

| | | |
|---|---|---|
| 0 452 592 A1 | 12/1990 | European Pat. Off. |
| 27 39 290 | 8/1977 | Germany. |
| 88 08 333 | 6/1988 | Germany. |
| 2 033 247 | 10/1979 | United Kingdom. |
| 2 261 830 | 6/1993 | United Kingdom. |

*Primary Examiner*—Robert Spitzer
*Attorney, Agent, or Firm*—Kennedy Covington Lobdell & Hickman

[57] ABSTRACT

A filter system utilizing a coalescing-type filter element with at least one end cap and a transport layer such that contaminants are filtered from a gas stream, coalesced and drained from the filter element completely exterior to any other component of the filter element. The filter element includes a drainage sleeve which may extend over and exterior to at least one end cap. The filter element may include a transport layer disposed exterior to a drainage layer extending between end caps. The present invention further includes a method for decontaminating a gas stream utilizing the filter system and filter element.

11 Claims, 8 Drawing Sheets

U.S. PATENT DOCUMENTS

| | | | |
|---|---|---|---|
| 4,516,994 | 5/1985 | Kocher | 55/498 X |
| 4,600,416 | 7/1986 | Mann | 55/323 |
| 4,676,807 | 6/1987 | Miller et al. | 55/487 X |
| 4,759,782 | 7/1988 | Miller et al. | 210/489 X |
| 4,767,426 | 8/1988 | Daly et al. | 55/487 |
| 4,838,903 | 6/1989 | Thomaides et al. | 95/286 |
| 4,878,930 | 11/1989 | Manniso et al. | 55/493 |
| 4,915,714 | 4/1990 | Teague et al. | 55/486 |
| 4,976,759 | 12/1990 | Foltz | 55/487 |
| 5,002,593 | 3/1991 | Ichishita et al. | 55/218 |
| 5,066,318 | 11/1991 | McDonough | 55/502 |
| 5,082,476 | 1/1992 | Kahlbaugh et al. | 95/287 |
| 5,298,044 | 3/1994 | Sutton et al. | 55/378 |
| 5,336,405 | 8/1994 | Tang et al. | 210/232 |
| 5,350,515 | 9/1994 | Stark et al. | 210/493.2 |
| 5,454,858 | 10/1995 | Tokar et al. | 55/498 X |
| 5,496,627 | 3/1996 | Bagrodia et al. | 428/284 |
| 5,512,175 | 4/1996 | Saito et al. | 210/489 X |
| 5,605,748 | 2/1997 | Kennedy et al. | 210/488 X |

FILTER DRAINAGE LAYER ATTACHMENT

CROSS-REFERENCE TO RELATED APPLICATION

This is a continuation-in-part of application Ser. No. 08/499,478, filed Jul. 7, 1995 for FILTER DRAINAGE LAYER ATTACHMENT, abandoned.

BACKGROUND OF THE INVENTION

The present invention generally relates to the filtration of a contaminated gas stream. More particularly, the present invention is directed toward a filter system utilizing a modular filter element having a coalescing section which filters out and coalesces contaminants from a gas stream in order that the contaminants may drain from the filter.

To decontaminate a gas stream, conventional filter systems utilize a filter element having an end cap positioned so that drainage of the coalesced contaminants occurs either through the end cap or along an outside edge of the end cap.

A particular filter element currently in use includes an end cap chemically bonded to the element and having a portion located exterior to all of the remaining elements within the end cap. In this arrangement, contaminants coalesce and drain from the gas stream. Through gravity, the coalesced contaminants drip into the end cap. When enough contaminants drip into the end cap, eventually the contaminants will spill over and drip down the exterior of the end cap portion.

Deficiencies exist with this conventional arrangement. One deficiency is that the contaminants create a slick and messy surface on the end cap, hampering replacement of the filter element. Without a non-stick surface, removing such a filter element from a filter system is made more difficult.

Another conventional arrangement includes a filter element having an end cap with a plurality of slots provided therein to allow for drainage of coalesced contaminants through a lower surface of the end cap. An example of such an arrangement may be found in United Kingdom Patent Application 2,261,830.

Deficiencies exist in this arrangement. The end cap described in UK Patent Application 2,261,830 must be formed with greater lateral dimensions, which makes manufacture of the filter element more expensive and may interfere with the close tolerances required in conventional filter system vessels.

Another deficiency with existing drain layer materials is the ability to drain high concentrations of liquid contaminant without re-entraining said contaminant. The liquid drainage rate is limited by the structure of the existing materials. The ultimate filtration capacity and efficiency are directly effected by the drainage capacity.

SUMMARY OF THE INVENTION

The present invention alleviates the aforementioned deficiencies found in the prior art by providing a filter element of inexpensive construction which provides a drainage pathway exterior to an end cap for draining away coalesced liquids with increased flow capacity, increased efficiency or both.

The present invention is directed to a filter system utilizing a cylindrical filter element with a filter medium for filtering out contaminants from a gas stream. Such a system may include a filter tank, an intake pipe, an outlet pipe and a filter vessel within which a filter element is positioned. The filter element is used within the system in such a way as to allow for easy removal of the filter element for replacement or cleaning.

The filter element of the present invention includes, along with the filter medium, a filter drainage sleeve and a transport layer positioned outwardly from the medium. Furthermore, the filter element may include end caps on either end of the element, with at least one end cap having an outer circumference with an outwardly facing surface. Also, the transport layer may be positioned such that it extends outwardly of at least one end cap. The transport layer overlays a drainage sleeve that extends up to but not over the end caps. The transport layer extends down over and outside the end caps. In addition, the filter element of the present invention may include means for attaching the drainage sleeve to the end cap at which drainage of the contaminants take place, hereinafter called the bottom cap.

The filter element of the present invention also may incorporate a porous inner core located interior to the filter medium. Alternatively, or in addition, the filter element may include a porous outer core positioned between the filter medium and the filter drainage sleeve.

The present invention is further directed to a method of filtering a contaminated gas stream. This method includes the introduction of a gas stream into a filter system, passing the gas stream into a core of a tubular filter element and allowing the gas stream to pass into a coalescing section of the filter element. In this manner, the gas stream is purified by separating the contaminants from the gas stream and coalescing them within the coalescing section. The method may further provide for the elimination of the contaminants from the filter elements by allowing the contaminants to drip from the lower outer most portion of the filter element into the filter system vessel, which includes a drain for draining out the contaminants.

An object of the present invention is to provide a filter system utilizing a coalescing-type filter element. Such a system may include a filter tank, an intake pipe, an outlet pipe and a filter vessel within which such a filter element is positioned. The coalescing-type filter element is constructed to filter contaminants from a gas stream entering the system and remove the contaminants through a filter drainage sleeve or a transport layer positioned such that at least its lower portion is exterior to an end cap positioned there.

It is a further object of the present invention to provide means for attaching the filter drainage sleeve to at least one end cap on the filter element.

It is a further object of the present invention to provide a porous inner core which provides support to the filter element as well as assists in the filtering of the contaminated gas stream. Additionally, it is an object of the present invention to provide a porous outer core which provides enhanced support to the filter element as well as assists in the filtration of the gas stream.

It is a further object of the present invention to provide a method for filtering out a contaminated gas stream utilizing the above-described filter system and filter element.

DETAILED DESCRIPTION OF THE PREFERRED EMBODIMENTS

Figure 1:
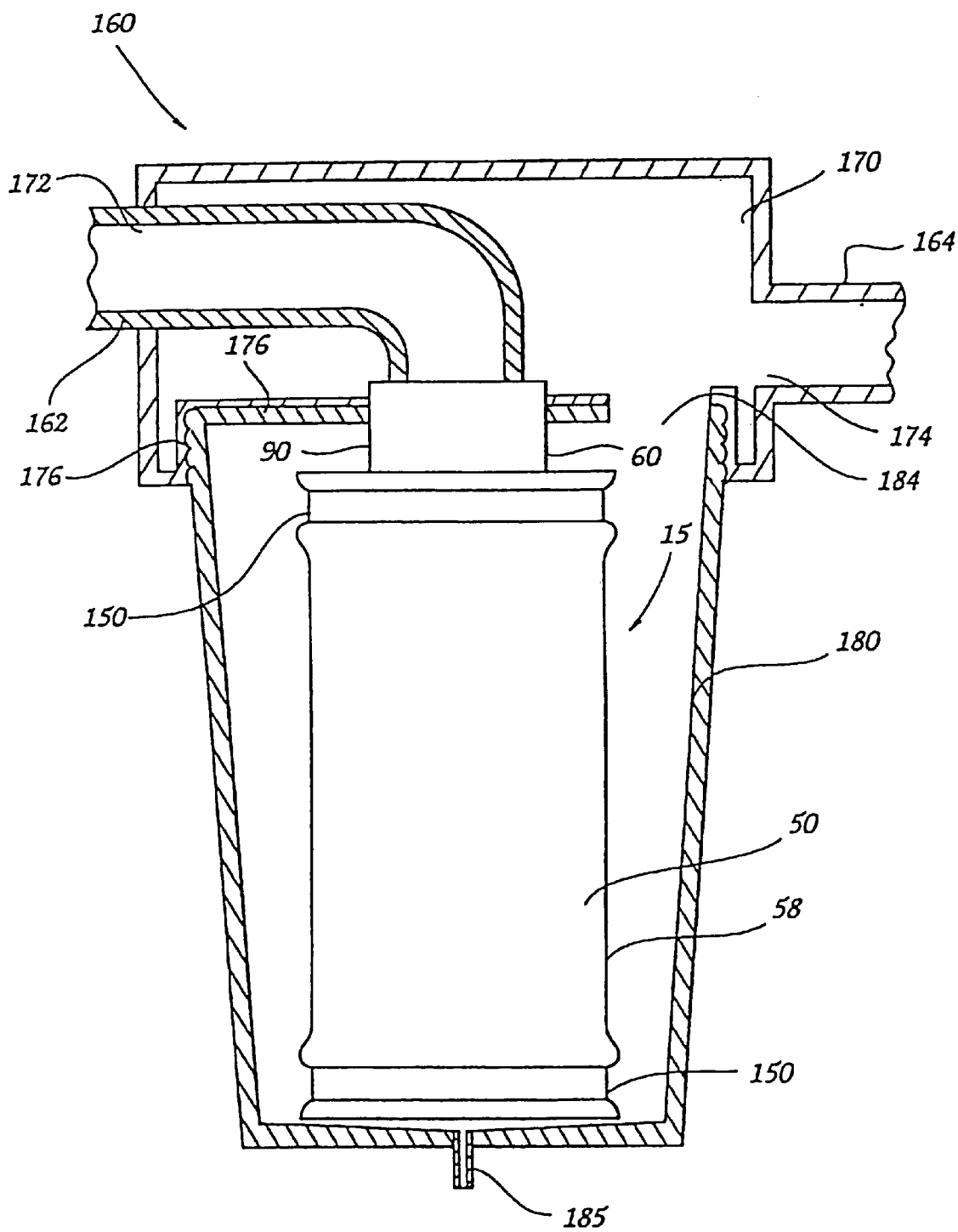
FIG. 1 is a partial cross-sectional view of a preferred embodiment of a filter system according to a preferred embodiment of the present invention.
Figure 5:
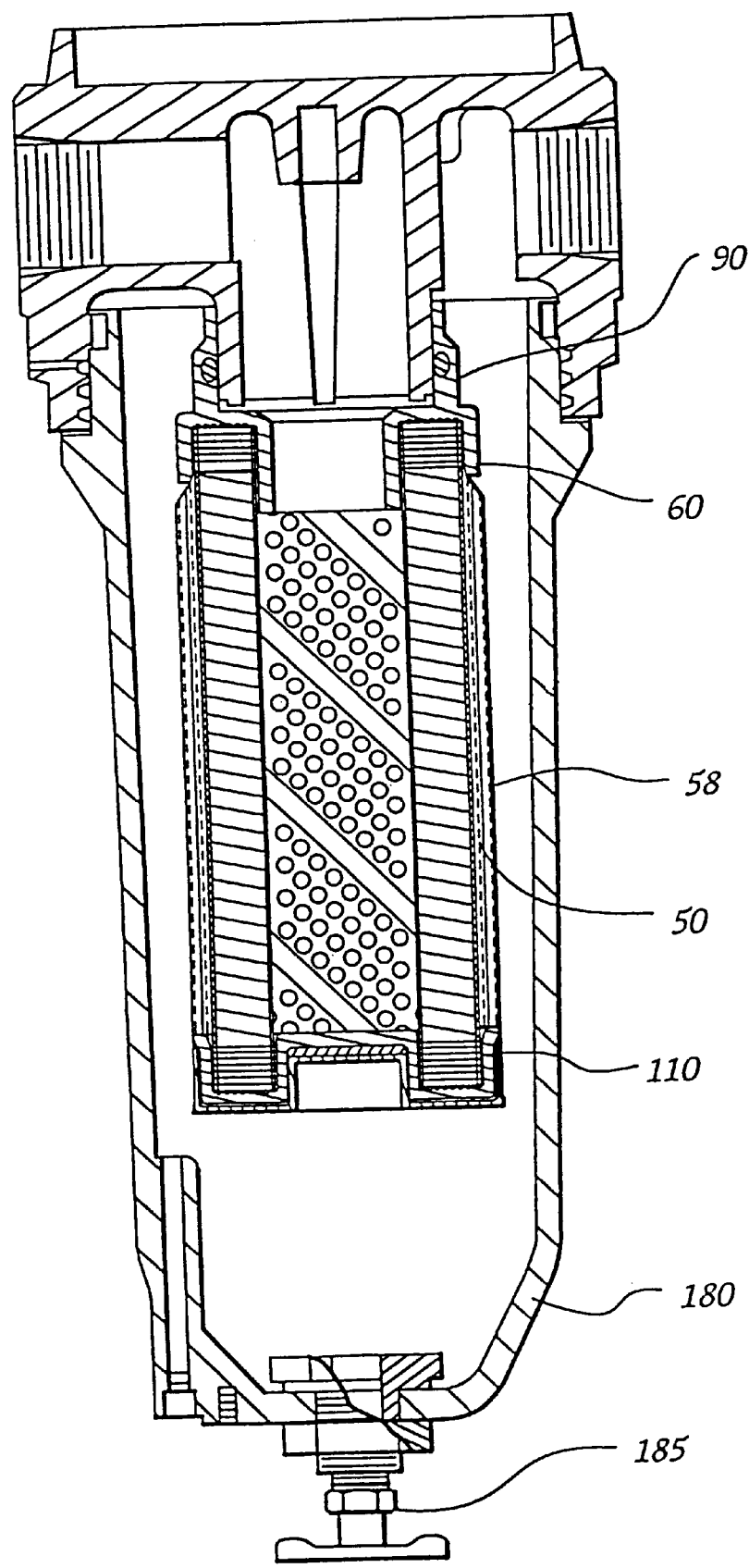
FIG. 5 is a second cross-sectional view of another embodiment of a filter system according to another preferred embodiment of the present invention.
Figure 6:
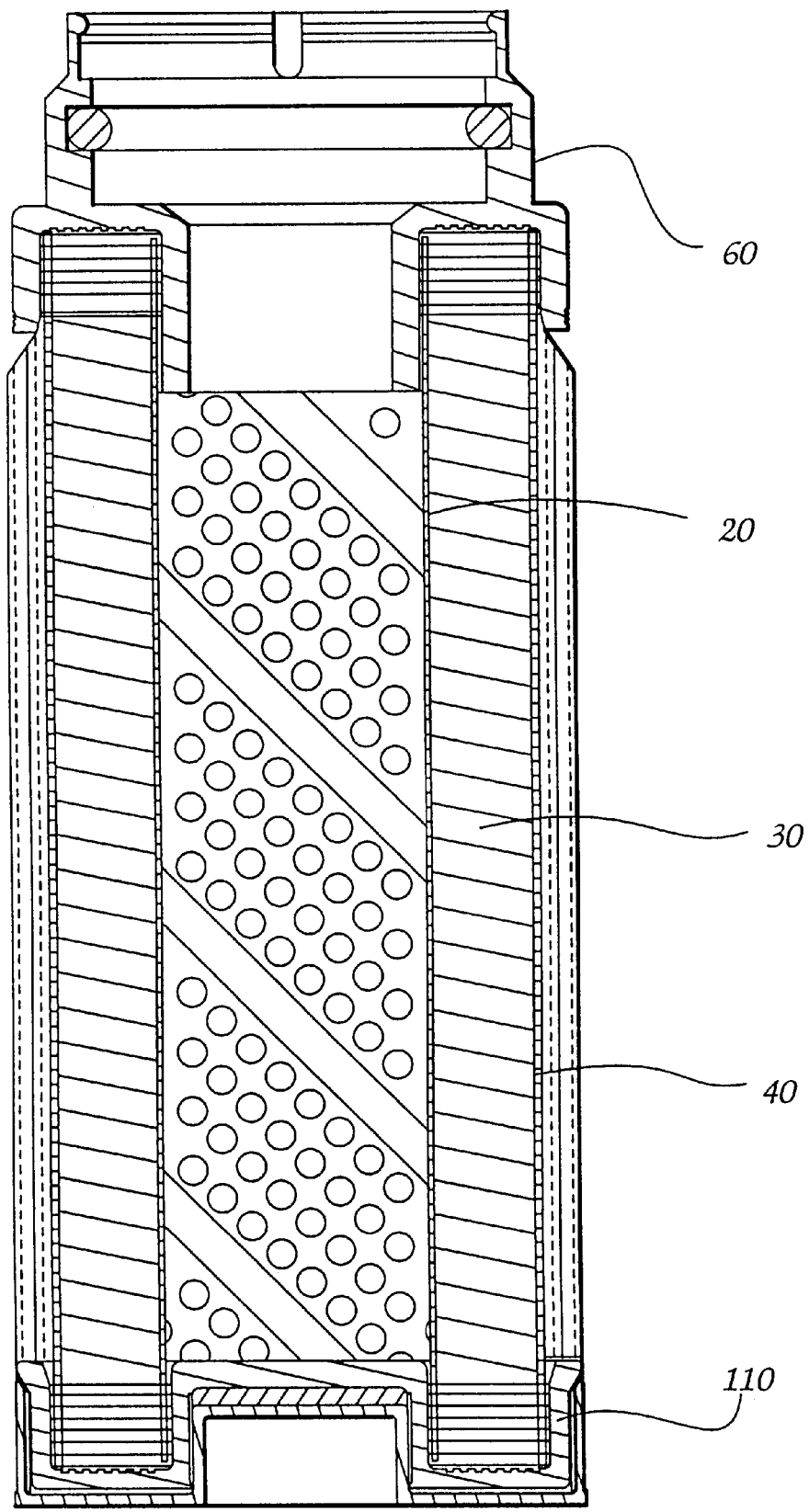
FIG. 6 is a cross-sectional view of the filter element of the system of FIG. 5.
Figure 7:
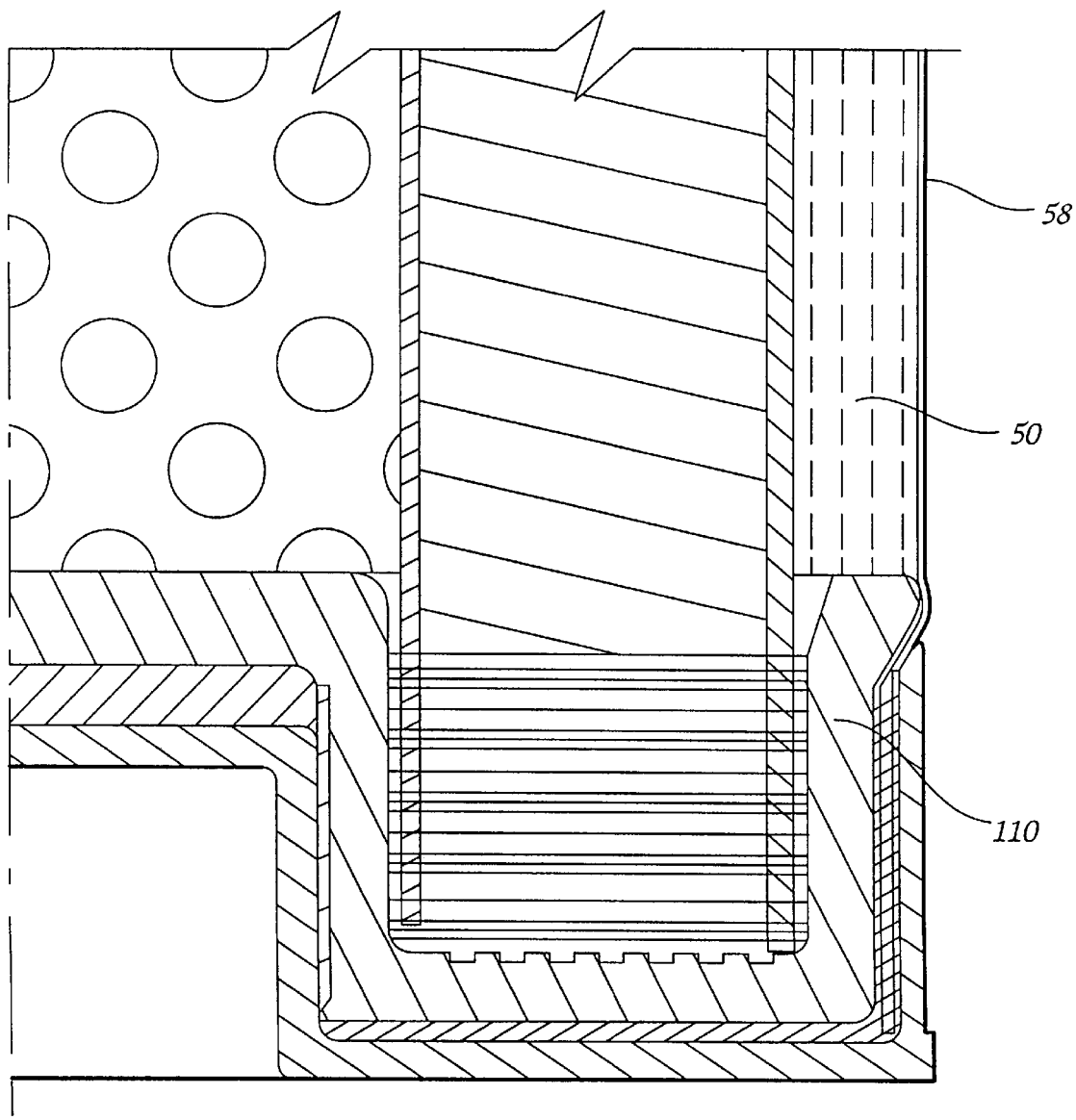
FIG. 7 is a detailed view of the bottom portion of the filter element of FIG. 5.
Figure 8:
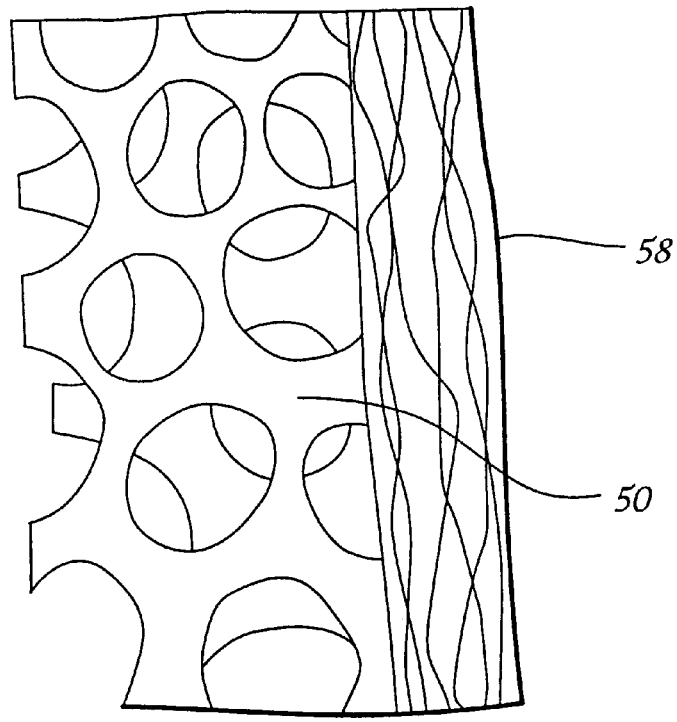
FIG. 8 is a cross-sectional view of the drain layer and Transport Layer of the filter element.
Figure 9:
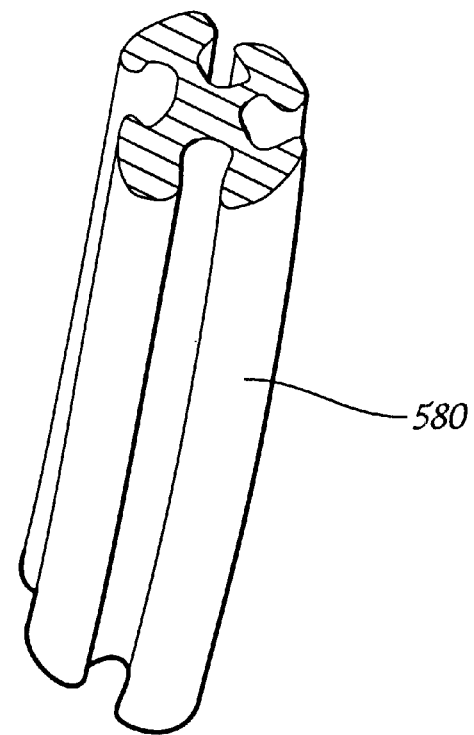
FIG. 9 is a cross-sectional view of a typical transport layer fiber.

Referring now to the drawings, where like numerals denote like elements, FIG. 1 and FIG. 5 each show a preferred embodiment of a filter element 15 within filter system 160. As shown in FIG. 1, and FIG. 5, filter element 15 includes a top cap 60. Top cap 60 has a top cap stem 90. Further included in filter element 15 is a filter drainage layer 50, made of a material which allows the flow of contaminants therethrough, such as open cell foam polyester fibers or other suitable materials. Drainage layer 50 has an outside transport layer, which enhances the ability of the filter to drain condensate while minimizing reentraining of the condensate. The transport layer 58 consists of multi-grooved fibers 580 (see FIG. 9) that are oriented in the vertical plane. The grooves act as capillaries pulling the condensate downwardly from the drain layer 50 by wicking action, draining the condensate to the bottom of the vessel 180 and then out the vessel drain 185.

Figure 2:
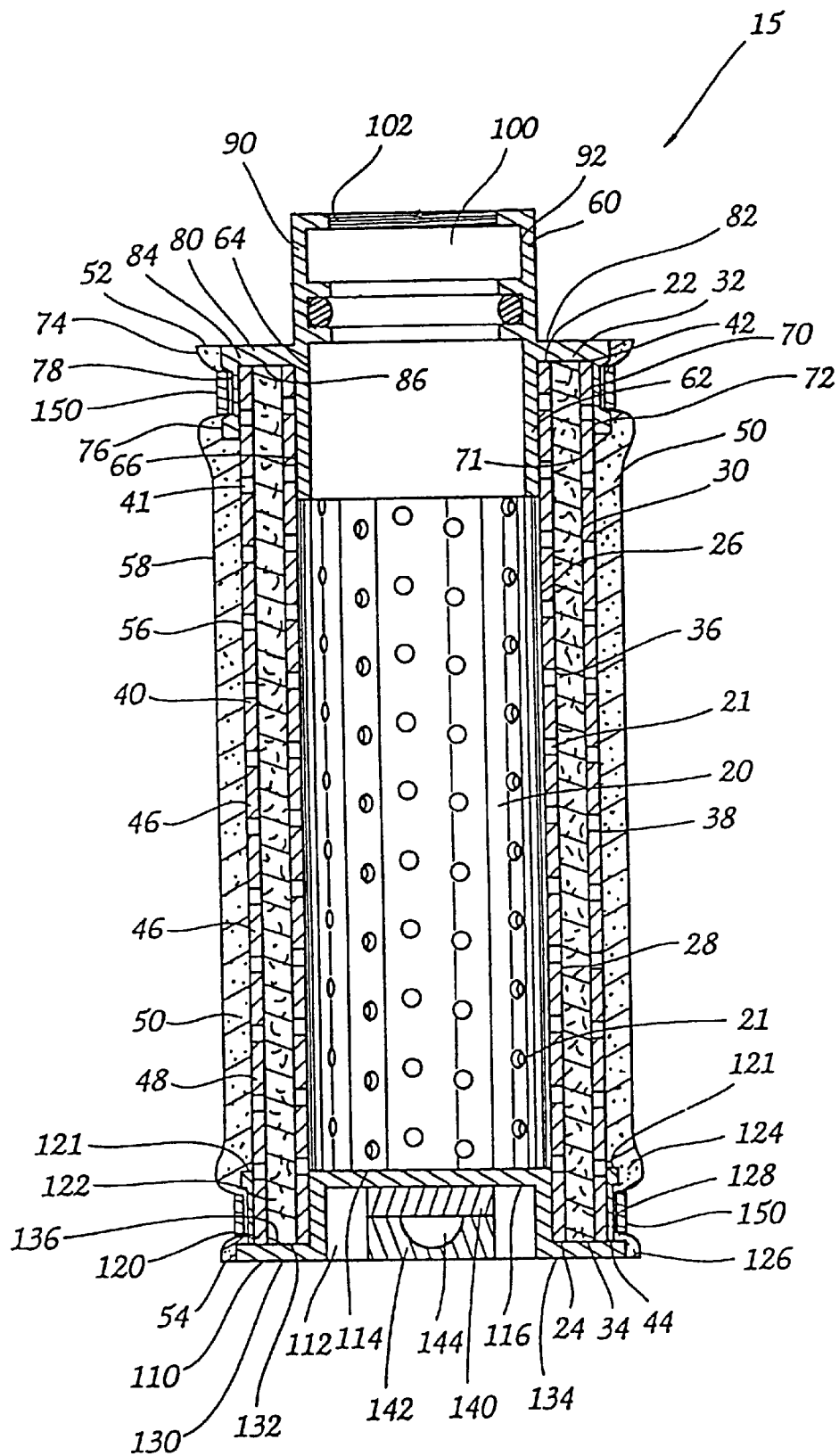
FIG. 2 is a cross-sectional view of the filter element of the system of FIG. 1.
Figure 3:
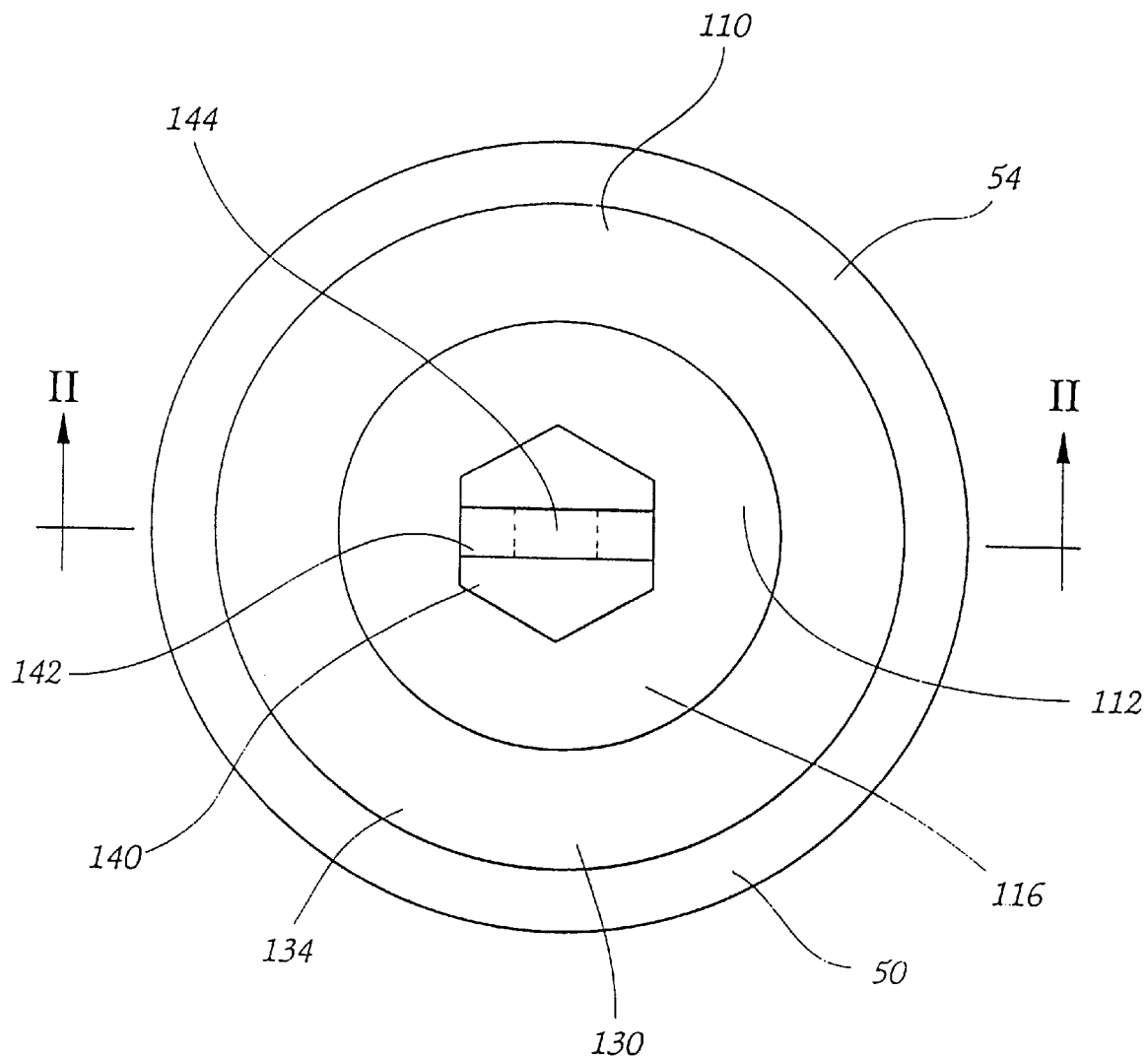
FIG. 3 is a view of the bottom of the filter element of FIG. 1.

FIG. 3 is a bottom view of a preferred embodiment of the bottom end cap 110. The bottom end cap 110 is completely encircled by transport layer 58 and includes a bottom cap portion 130 and a bottom cap well 112. Bottom cap portion 130 has a lower surface 134. A drainage sleeve bottom end 54 is roughly within the same plane as bottom cap portion lower surface 134, which can be better seen in FIG. 2. The bottom end cap 110 contains a radial projection extending outward of the bottom end cap 110 resulting in an enhanced flow path for the condensate.

In addition to top cap 60, bottom cap 110, filter drainage sleeve 50 and transport layer 58, all discussed above, filter element 15 further includes a filter medium 30 located interior to drainage sleeve 50. Additionally, filter element 15 may include a porous inner core 20 or a porous outer core 40 or both. The cores 20 and 40 both provide support for the filter medium 30 as well as assist in filtering out contaminants from the gas stream. Inner core 20 has pores 21 and outer core 40 has pores 41. Both cores 20, 40 may be composed of a perforated material such as perforated metal. Alternatively, the cores 20, 40 may be composed of a mesh-like material. Such a mesh-like material may be composed of any suitable material that would lend support to the filter media 30, such as plastic and wire mesh.

With reference to FIGS. 2, 3, bottom cap well 112 includes an upper surface 114 and a lower surface 116. Within bottom cap well 112 may be positioned a bottom cap nut 140 which may include a bottom cap ring 142. The bottom cap ring 142 includes an aperture 144. Bottom cap ring 142 is so placed within bottom cap well 112 for easy removal of the filter element 15 from a filter system. Although bottom cap nut 140 is shown to be hexagonal in FIG. 3, the present invention is not so limited. The present invention envisions any suitable means that would allow for easy removal and replacement of filter element 15.

As shown in FIG. 2, the outer core 40, the filter medium 30 and the inner core 20 each have, respectively, top ends 42, 32, 22. Furthermore, the bottom ends of outer core 40, filter medium 30 and inner core 20 each have, respectively, bottom ends 44, 34, 24. Ends 22, 32, 42 are all substantially within the same plane and are adapted to receive a surface of top cap 60. Likewise, bottom ends 24, 34, 44 are all substantially within the same plane and are adapted to receive a surface of bottom cap 110. Inner core 20 further includes an inside surface 26 and an outside surface 28. The inside surface 26 of inner core 20 is adjacent to and may abut a surface of top cap 60 as well as a surface of bottom cap 110. Outside surface 28 of inner core 20 faces inside surface 36 of filter medium 30. Outer core 40 further has an inside surface 46 which faces outside surface 38 of filter medium 30. In addition, outer core 40 has an outside surface 48 which faces drainage layer inside surface 56.

Next will be described in greater detail a preferred embodiment of top cap 60, as shown in FIG. 2. Top cap 60 includes a stem 90 and may include an inner projection 62 and an outer projection 70. Inner projection 62 includes an inside surface 64 and an outside surface 66. Outside surface 66 faces inner core inside surface 26. Top cap outer projection 70 further includes a lower surface 71, an inside surface 72 and an outside surface 78. Inside surface 72 faces outer core outside surface 48. Top cap outer projection outside surface 78 may further include an upper lip 74 and a lower lip 76.

Top cap portion 80 is located in a plane roughly perpendicular to projections 62, 70. Portion 80 includes an upper surface 82 and a lower surface 84. Lower surface 84 abuts top ends 22, 32, 42 of inner core 20, filter medium 30 and outer core 40. Lower surface 84 may further include surface ridges 86. Ridges 86 may enhance attachment of surface 84 of top cap 60 to top ends 22, 32, 42 through a chemical bond, such as epoxy, resin or glue applied thereon. Surface 82 of top cap portion 80 is roughly within the same plane as a filter drainage sleeve top end 52 of drainage sleeve 50.

Located throughout end cap 60 and contiguous with top cap inside surface 92 is an intake 100. As shown in FIG. 2, a threaded intake opening 102 is located at the uppermost portion of top cap 60 and may be used to connect the filter element 15 to an intake pipe 162 of filter system 160 (described in greater detail below).

Next will be described in further detail a preferred embodiment of bottom cap 110, as shown in FIG. 2. Bottom cap portion 130 includes a lower surface 134 and an upper surface 132. Upper surface 132 abuts against bottom ends 24, 34, 44 of inner core 20, filter medium 30, and outer core 40, respectively. Upper surface 132 may further include ridges 136 which function similarly to top cap lower surface ridges 86 described above.

Bottom cap 110 may further include an outer projection 120. Outer projection 120 includes an upper surface 121 and an inside surface 122, which faces outer core outside surface 48.

Outer projection 120 also includes an outside surface 128, which faces filter drainage sleeve inside surface 56. Outside surface 128 may further include an upper lip 124 and a lower lip 126. Finally, bottom cap 110 includes bottom cap well upper surface 114. This well upper surface 114 prevents the gas stream that flows into filter element 15 through intake 100 from flowing out of filter element 15 through bottom cap 110.

Figure 4:
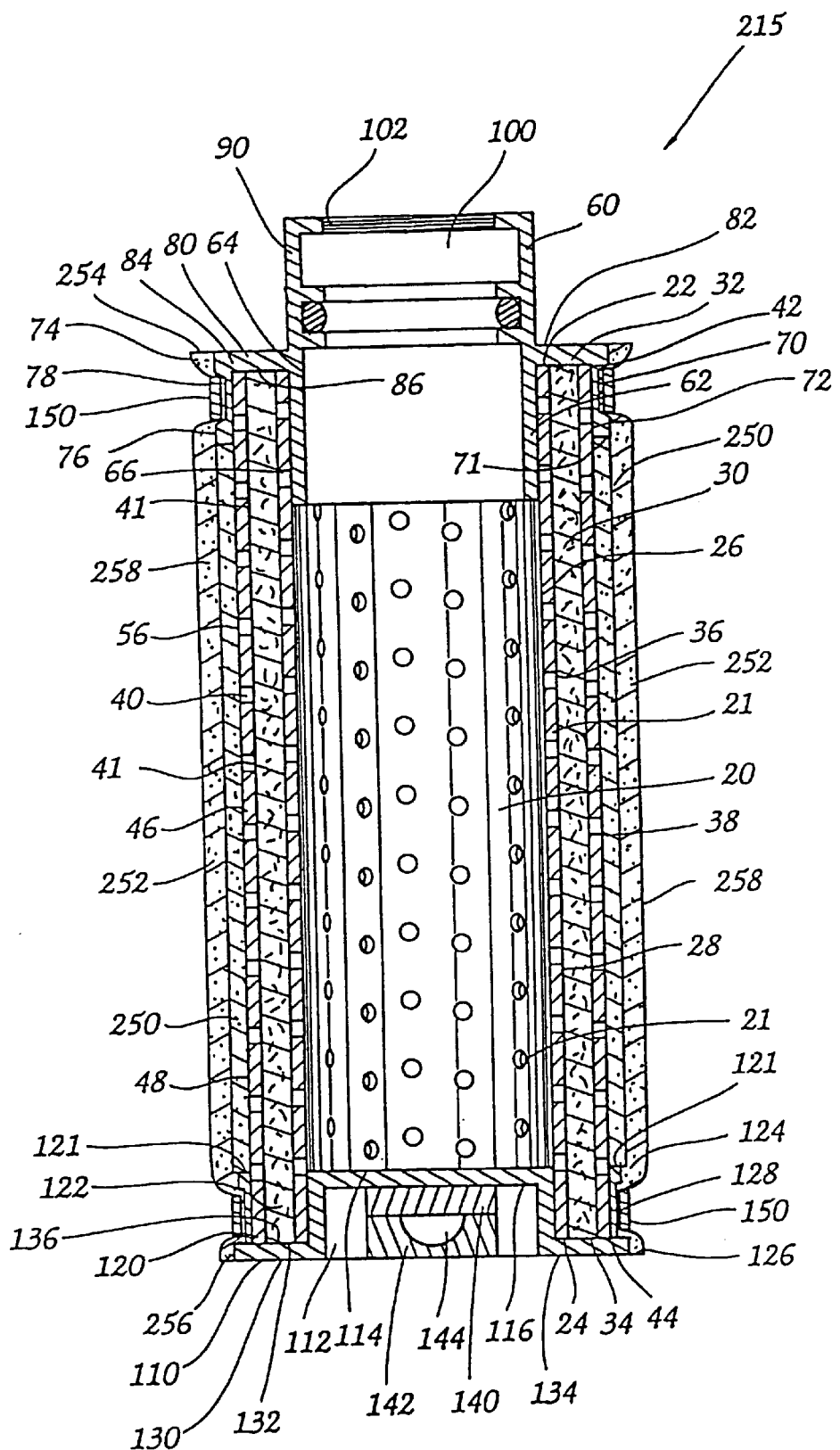
FIG. 4 is a cross-sectional view of another preferred embodiment of the filter element according to the present invention.

Next will be described another preferred embodiment of a filter element. As shown in FIG. 4, filter element 215 is of similar construction to filter element 15. Filter element drainage sleeve 250 is disposed outwardly from outer core 40. Drainage sleeve 250 extends along the length of outer core 40 like drainage sleeve 50. Unlike drainage sleeve 50, sleeve 250 stops short of top cap outer projection lower surface 71 and bottom cap outer projection upper surface 121. Alternatively, drainage sleeve 250 may terminate by abutting top cap outer projection lower surface 71 and bottom cap outer projection upper surface 121.

Further included in filter element 215 is a transport layer 252, having an outer surface 258, a top end 254 and a bottom end 256. Transport layer 252 is formed of a material allowing contaminants to travel therethrough and may be formed of the same or similar material as drainage sleeves 50, 250. As shown in FIG. 4, transport layer 252 is disposed exterior to drainage sleeve 250. Transport layer 252 extends the length of outer core 40 and terminates with its top end 254 roughly in the same plane as top cap portion upper surface 82 and its bottom end 256 roughly in the same plane as bottom cap portion lower surface 134.

Transport layer 252 may be attached to caps 60, 110 by way of mechanical and/or chemical bonds, as discussed above in regard to drainage sleeve 50 of filter element 15. Specifically, constriction bands 150, or another suitable mechanical bond, may be used to attach transport layer 252 to caps 60, 110. Alternatively, any suitable chemical bond, such as epoxy, resin or glue, may be used, alone or in concert with a mechanical bond, to attach transport layer 252 to caps 60, 110.

Drainage sleeve 250, transport layer 252 and constriction bands 150 may be colorized so as to provide color coding for specific sizes and types of filter elements 15, 215. Further, drainage sleeve 250, transport layer 252 and constriction bands 150 may be formed of a material capable of receiving a marking, such marking to identify the filter element 15, 215 by product number, company name and/or by trademark, logo or the like.

FIG. 1 shows a preferred embodiment of a filter system 160 which utilizes a filter element 15. It is to be understood that filter element 215 may also be utilized within the filter system 160. Filter system 160 includes a filter system intake pipe 162, a filter system outlet pipe 164, a filter tank 170 and a filter vessel 180. Intake pipe 162 enters tank 170 at tank intake 172 and proceeds into filter element intake 100 (FIG. 2) of stem 90 within top cap 60. Filter system outlet pipe 164 exits from filter system 160 at filter tank outlet 174.

Filter vessel 180 is attachable to and removable from filter tank 170. Filter vessel 180 creates a seal 176 between itself and filter tank 170 when properly attached. The seal 176 prevents the escape of the gas stream from the filter system 160. Vessel 180 also includes an outlet 184 into tank 170 to allow the gas stream exiting filter element 15 to flow into outlet pipe 164. Vessel 180 further includes a vessel drain 185 located at a bottom portion of vessel 180. As can be seen in FIG. 1, the lowest portion of vessel 180 may slope downwardly toward vessel drain 185. The drain 185 is positioned in order to allow contaminants which are filtered out of the gas stream to exit the filter system 160.

Next will be described a method of filtering a contaminated gas stream through the filter element 15 as described above. Although the method is described with reference to filter element 15, it is to be understood that the method is equally applicable for use with filter element 215. With reference to FIGS. 1, 2, a filter element 15 is attached to a filter tank intake 172 of filter system 160. A gas stream passes into filter system 160 by way of intake pipe 162, which leads into filter tank intake 172. The gas stream, which is contaminated with various particulates, passes into filter element 15 through top cap 60. Specifically, the gas stream passes through the intake 100 and into inner core 20. Due to bottom cap well upper surface 114, the gas stream is prevented from passing out of filter element 15 through bottom cap 110. Instead, the contaminated gas stream is directed through pores 21 in inner core 20. The contaminated gas stream then passes into the outwardly situated filter medium 30. This filter medium is a coalescing type of medium. As the gas stream passes through filter medium 30, the particulates and other contaminants are separated out. As the particulates and other contaminants separate out, they coalesce within the filter medium 30.

While the gas stream continues its outward progression in filter element 15, the filtered out coalesced contaminants are captured in the drain layer and drained to the bottom of the filter element by capillary action in the transport layer 58 in conjunction with gravity. Thus, as the gas stream passes out of drainage sleeve 50, the coalesced contaminants continue an outward and downward migration into drainage sleeve 50. Once in drainage sleeve 50, the coalesced contaminants continue to move downwardly in drainage sleeve 50. Eventually, the coalesced contaminants will reach the filter drainage bottom end 54. The coalesced contaminants exit filter element 15 from the filter drainage bottom end 54. In this manner, the coalesced contaminants exit filter element 15 at a position exterior to bottom cap 110. Thus, bottom cap 110 does not itself become contaminated by the coalesced contaminants. The coalesced contaminants eventually exit the filter system 160 through filter vessel drain 185.

With reference to FIG. 4, as the gas stream passes is outwardly from filter element 215, the contaminants coalesced in filter medium 30 travel outwardly and downwardly into drainage sleeve 250. From drainage sleeve 250, the contaminants progress outwardly into transport layer 252, which allows the contaminants to travel downwardly to exit filter element 215 at bottom end 256.

With reference to FIG. 1, as the gas stream exits filter drainage sleeve 50 of filter element 15, or transport layer 252 of filter element 215, it passes through filter vessel outlet 184 into filter tank 170. From there, the gas stream exits the filter system 160 through filter system outlet pipe 164.

The above description and drawings are merely illustrative of a preferred embodiment which achieves the objects, features and advantages of the present invention. It is not intended that the present invention be limited thereto. Any modification of the present invention which comes within the spirit and scope of the following claims is considered part of the present invention. For example, although the filter element is illustrated in preferred embodiments as having a drainage sleeve or a transport layer attached by a constriction band, other mechanical bonds and/or chemical bonds are considered within the scope of the present invention. Furthermore, positional descriptors such as "upper end cap" and "lower end cap" are to be understood in relation to the figures in which such elements appear. The present invention is not so limited to such positional descriptors. It is to be understood that the scope of the present invention encompasses all orientations wherein the present invention functions.

It will therefore be readily understood by those persons skilled in the art that the present invention is susceptible of broad utility and application. Many embodiments and adaptations of the present invention other than those herein described, as well as many variations, modifications and equivalent arrangements, will be apparent from or reasonably suggested by the present invention and the foregoing description thereof, without departing from the substance or scope of the present invention. Accordingly, while the present invention has been described herein in detail in relation to its preferred embodiment, it is to be understood that this disclosure is only illustrative and exemplary of the present invention and is made merely for purposes of providing a full and enabling disclosure of the invention. The foregoing disclosure is not intended or to be construed to limit the present invention or otherwise to exclude any such other embodiments, adaptations, variations, modifications and equivalent arrangements, the present invention being limited only by the claims appended hereto and the equivalents thereof.

I claim:

1. A filter arrangement for removing contaminants from a fluid passed therethrough, comprising:

(i) a filtering medium in which the contaminants coalesce;

(ii) a filter drainage layer disposed adjacent said filtering medium for receiving coalesced contaminants therefrom; and (iii) a transport layer disposed in abutment with said filter drainage layer, said transport layer comprising fibers having grooves which draw through capillary action coalesced contaminants from said filter drainage layer.

2. The filter arrangement as recited in claim 1, wherein said filter drainage layer includes open cell foam.

3. The filter arrangement as recited in claim 1, wherein said filter drainage layer includes polyester fibers.

4. The filter arrangement as recited in claim 1, wherein the grooved fibers are disposed in substantially parallel relation.

5. An elongated tubular filter element extending along a tubular axis thereof for removing condensable contaminants from a gas, comprising:

(i) a porous core extending about the tubular axis;

(ii) a filtering medium extending about said porous core in which the contaminants coalesce;

(iii) a filter drainage layer extending about said filtering medium for receiving coalesced contaminants therefrom; and (iv) a transport layer extending about and in abutment with said filter drainage layer, said transport layer comprising fibers having grooves which draw through capillary action coalesced contaminants from said filter drainage layer.

6. The tubular filter element as recited in claim 5, wherein said filter drainage layer includes open cell foam.

7. The tubular filter element as recited in claim 5, wherein said filter drainage layer includes polyester fibers.

8. The tubular filter element as recited in claim 5, wherein the grooved fibers are disposed in substantially parallel relation to the tubular axis of the filter element such that coalesced contaminants are wicked along the tubular axis through capillary action.

9. The tubular filter element as recited in claim 5, further comprising an end cap defining a well extending about the tubular axis of the filter element, wherein an end of said filtering medium is retained within said end cap well, wherein said filter drainage layer and said transport layer extend circumferentially about said end cap, and wherein said end cap is disposed completely within an interior spaced defined by said filter drainage layer.

10. The tubular filter element as recited in claim 5, further comprising an end cap defining a well extending about the tubular axis of the filter element, wherein an end of said filtering medium is retained within said end cap well, wherein said transport layer extends circumferentially about said end cap, and wherein said end cap is disposed completely within an interior space defined by said transport layer.

11. The tubular filter element as recited in claim 10, further comprising a retention clip releasably attached to said end cap and defining a recess for receipt therein of said end cap and said transport layer, said retention clip extending about said transport layer and retaining said transport layer against said end cap.

* * * * *